W. C. GRIMES.
Machine for Separating Garlic from Wheat.
No. 1,763.
Patented Sept. 3, 1840.
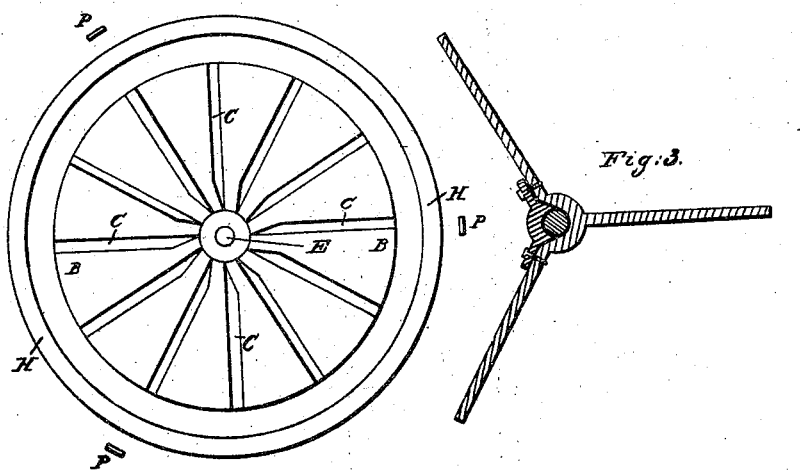
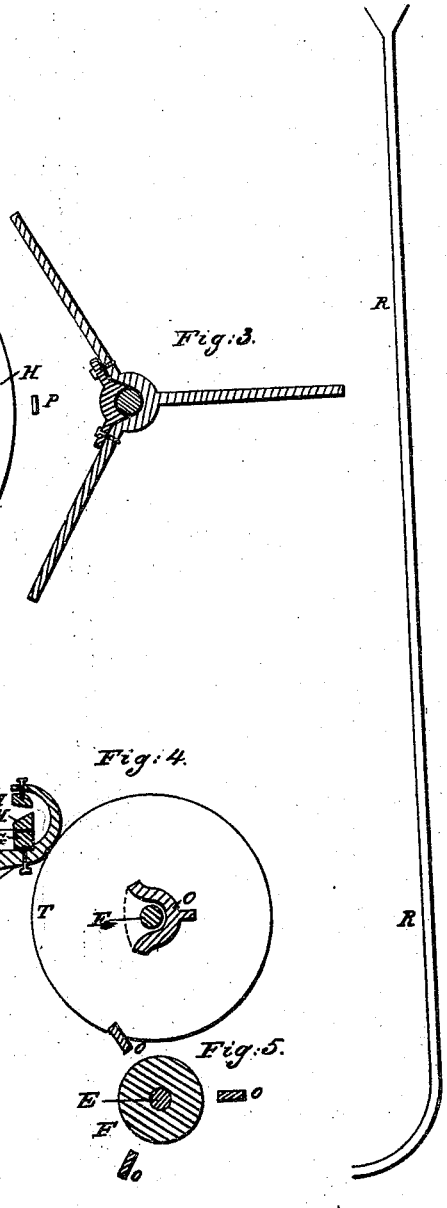
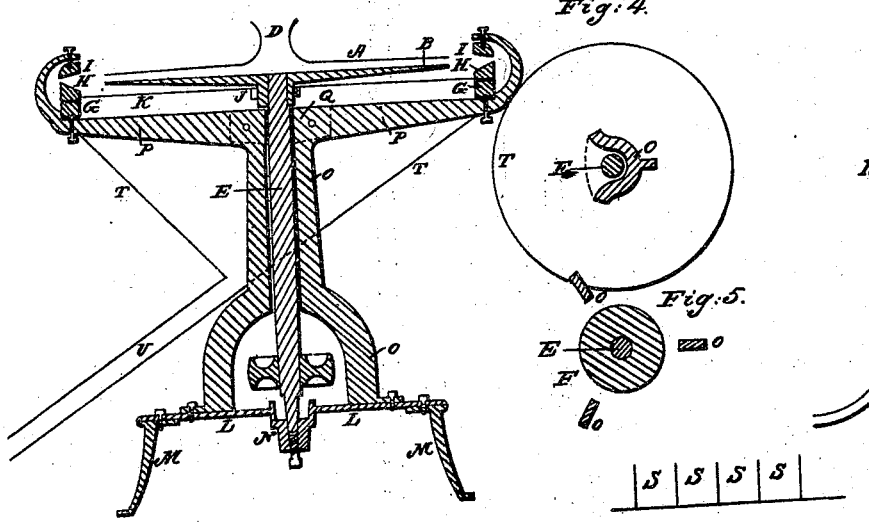

UNITED STATES PATENT OFFICE.

WM. C. GRIMES, OF YORK, PENNSYLVANIA.

MACHINE FOR SEPARATING GARLIC FROM GRAIN.

Specification of Letters Patent No. 1,763, dated September 3, 1840.

*To all whom it may concern:*

Be it known that I, WM. C. GRIMES, of York, in the county of York and State of Pennsylvania, have invented a new and useful Machine for Separating Garlic and other Foreign Matter from Wheat and other Small Grain, and that the following is a full description thereof, reference being had to the drawings, which accompany and make part of this specification.

To separate two kinds of seed or grain by machinery where the weight and size of the two are the same, or nearly so, would be perhaps altogether impracticable did not one possess some property essentially different from the other. Wheat and garlic are found in this relation, similar in weight and size, but differing in solidity; hence the comparatively soft and yielding nature of the one, may be made the basis of a process for its separation. And I proceed upon the fact, or principle, that the wheat or grain will completely resist any force which would be necessary to drive the garlic through a groove or crevice too fine for either to pass without the application of force. But whatever may be the form or modification of the machine, I prefer and use no other than projectile force.

The machine which I have devised for the purpose, consists of a hollow, radial chambered, wheel, formed by two metallic disks, A, and, B, of about two feet diameter, which lie parallel, and are distant from each other about three lines. The space between the disks is divided by some ten or twelve radial partitions, C, C, C, through which the screws or rivets pass that unite the disks. The upper disk has a central aperture of about four inches diameter, which is surmounted by a funnel shaped tube, D, of some three or four inches in height, and two inches caliber at the narrowest point. Through this the grain, &c., descends into the center of the wheel, from whence it radiates, and is thrown horizontally in all directions from the periphery, with a violence proportionate to its velocity. The lower disk is affixed to the top of a vertical axis E, with which it revolves, receiving impulse and motion by the pulley F. Three horizontal rings, G, H, I, encompass the wheel, leaving an annular space of some three or four inches in breadth around it. These rings are all of the same diameter, and lie in parallel planes, the one above the other; the lower ring, answering merely as a base for the second, H, to revolve, or vibrate upon. The contiguous surfaces of the second and third rings, H, I, are beveled or rounded off inward, and are not at any point in contact, a space of about the twelfth of an inch intervening all around at their peripheries. This narrow space, lies in the same plane with that between the disks, which form the before mentioned radial chambered wheel; which last throws the grain, garlic, &c., into the wedge shaped groove or crevice between the beveled rings. The garlic being comparatively soft, yields to the necessary compression, and passes quite through the narrow groove, while the grain from its superior hardness resists such compression, and falls down the beveled surface of the ring into a large funnel shaped receiver, T, T, beneath the rings, from whence it is conducted by a tube, U, to the place required.

To prevent the sticking of the grain within the groove I give to the central ring, a vibratory or rotary movement. The former may be produced by turning the shaft or hub of the lower disk, B, slightly eccentric and embracing it by a closely fitting collar, J, and connecting the latter by arms, K, K, to the ring. Or the necessary vibration or tremor, between the rings, may be effected by allowing the central ring some lateral play, and then by throwing the radial wheel a little out of balance, the required vibration will be the result.

A rotary motion may be given to the ring by forming teeth upon its periphery, into which are made to move those of a small pinion upon a vertical shaft; a mode of gearing readily conceived, and easily accomplished by any competent machinist.

A broad plate or dish, L, raised a few inches upon feet, M, M, forms a base for the machine. The central portion of this plate is so cast as to form an oil box and bearing, N, for the lower journal of the central shaft. Upon, and firmly screwed to the said plate or base, stands a cast iron frame, O, O, of a tripod form, with three strong arms, P P P which support and hold the rings, G, H, I, in their relative position. The shaft of the radial wheel has its upper bearing in a suitable box Q, at the top of the frame or column of the tripod.

Machines operating upon the same principle as the one above described, may be very differently constructed; for instance the grain and garlic, may be thrown tangentially from a single point in a circular chamber, within which revolves wings or beaters attached to a suitable wheel. On a series of small rings in pairs, may be placed around the radial wheel, in numbers sufficient to receive the grain, &c., from all parts in which it is precipitated, the small rings all revolving in the plane of the radial wheel. With either of these modifications, the groove or grooves receiving the grain, &c., would necessarily be formed by rings beveled outward, and in this case they should be made to revolve, and upon separate axis; the grain being disengaged from the groove, by making the rings to revolve with different velocities; or by making one of the rings in each pair, of less diameter than its fellow; their peripheries coinciding only at the point where the grain impinges upon them, the latter flying off from the groove as the rings revolve; while the garlic passes through the narrow grooves formed by the proximity of their edges, as before shown.

As centrifugal force constitutes one essential feature of my machine, I will here remark, that I am aware that the principle of centrifugal force has long been known and applied to the propulsion of bodies, both fluid, and solid, and to other useful purposes, yet I verily believe that my machine presents some features of entire novelty, in its combination, and mode of action, (and to these alone do my claims refer) in the separation of two kinds of seed differing only in solidity by the combined action of projectile force, and compression; the former being the prime agent in the production of the latter, by throwing the seeds into a narrow wedge shaped groove with a force just sufficient to cause the more yielding or elastic seed to pass quite through.

Thus having fully shown and set forth the structure, principle, and operation, of my machine, and suggested some of the different modifications that this invention is susceptible of, I would add, that I do not mean to confine, or limit myself, to the particular form, size, proportion, or position, before specified; but intend to change and vary the same as experience may suggest, or convenience require, so long as the principles of action and the results obtained remain unchanged.

What I claim as new, and as my invention, and desire to secure by Letters Patent, is,

The mode of separating garlic, and other foreign matter, from wheat and other small grain, by means of the combined action of a hollow radial chambered wheel, and a series of rings, revolving in connection with, or remaining fixed around it, as herein set forth; the rings forming a narrow wedge shaped groove, into which the grain, garlic, &c., is thrown by the radial wheel, when the separation ensues, as before specified.

WM. C. GRIMES.

Witnesses:
JACOB C. GLESSNER,
GEO. BARRITZ.